United States Patent
Nattamai Ramdoss et al.

(10) Patent No.: US 12,158,867 B2
(45) Date of Patent: Dec. 3, 2024

(54) DYNAMIC SUMMARIZATION OF PROCESS DATA SYSTEM AND METHOD

(71) Applicant: AVEVA Software, LLC, Lake Forest, CA (US)

(72) Inventors: Arun Kumar Nattamai Ramdoss, Mission Viejo, CA (US); Vinay T. Kamath, Rancho Santa Margarita, CA (US); Alexander Vasilyevich Bolotskikh, Ladera Ranch, CA (US); Elliott Scott Middleton, Jr., Tyler, TX (US)

(73) Assignee: Aveva Software, LLC, Lake Forest, CA (US)

( * ) Notice: Subject to any disclaimer, the term of this patent is extended or adjusted under 35 U.S.C. 154(b) by 0 days.

(21) Appl. No.: 17/666,672

(22) Filed: Feb. 8, 2022

(65) Prior Publication Data
US 2022/0253412 A1    Aug. 11, 2022

Related U.S. Application Data

(63) Continuation of application No. 16/566,762, filed on Sep. 10, 2019, now abandoned.
(Continued)

(51) Int. Cl.
*G06F 16/21*    (2019.01)
*G06F 16/2458*    (2019.01)
(Continued)

(52) U.S. Cl.
CPC ........ *G06F 16/212* (2019.01); *G06F 16/2474* (2019.01); *G06F 16/248* (2019.01); *G06F 16/252* (2019.01)

(58) Field of Classification Search
CPC .. G06F 16/212; G06F 16/2474; G06F 16/248; G06F 16/252; G05B 23/0272; G05B 2219/32128
See application file for complete search history.

(56) References Cited

U.S. PATENT DOCUMENTS 6,609,085 B1 *    8/2003    Uemura ............... G05B 19/418
                                                          702/69
7,069,185 B1       6/2006    Wilson et al.
(Continued)

FOREIGN PATENT DOCUMENTS

KR    10-2016-0067146 A    6/2016

OTHER PUBLICATIONS

International Search Report and Written Opinion for International Application No. PCT/US2019/050471, Dec. 27, 2019, 9 pages.

*Primary Examiner* — Nicholas Klicos
(74) *Attorney, Agent, or Firm* — Dergosits & Noah LLP; Todd A. Noah (57) ABSTRACT

Some embodiments include a system and method of providing a historian that receives operational state data from a device of an industrial process of a network, where the operational state data is stored as time-series data, and processing at least one data query from at least one user coupled to the network. Based at least in part on the at least one data query and at least one dynamic cycle, at least some of the time-series data is retrieved, where the dynamic cycle is based on at least one tag associated with the time-series data. Further, based at least in part on at least some of the time-series data, at least one graphical representation of one or more tags is displayed, where each tag of the one or more tags represents an attribute of at least one process associated with the at least one device.

15 Claims, 5 Drawing Sheets

Related U.S. Application Data (60) Provisional application No. 62/729,345, filed on Sep. 10, 2018.

(51) Int. Cl.
    *G06F 16/248*     (2019.01)
    *G06F 16/25*     (2019.01)

(56) References Cited

U.S. PATENT DOCUMENTS

| | | | |
|---|---|---|---|
| 9,116,907 B2 | 8/2015 | Olmino | |
| 9,516,052 B1* | 12/2016 | Chauhan | G06F 16/248 |
| 2004/0181294 A1* | 9/2004 | Deitz | G05B 19/41865 |
| | | | 700/20 |
| 2005/0263591 A1* | 12/2005 | Smith | G06K 7/10346 |
| | | | 235/385 |
| 2007/0090178 A1* | 4/2007 | Fujii | G05B 23/0272 |
| | | | 235/375 |
| 2008/0027683 A1 | 1/2008 | Middleton et al. | |
| 2008/0065344 A1* | 3/2008 | Parker | E21B 47/00 |
| | | | 702/127 |
| 2009/0089233 A1* | 4/2009 | Gach | G05B 19/4185 |
| | | | 706/45 |
| 2011/0219327 A1 | 9/2011 | Middleton, Jr. et al. | |
| 2011/0282836 A1* | 11/2011 | Erickson | G06F 16/27 |
| | | | 707/622 |
| 2014/0244006 A1 | 8/2014 | Lee | |
| 2014/0310243 A1* | 10/2014 | McGee | G06F 16/27 |
| | | | 707/639 |
| 2015/0186483 A1 | 7/2015 | Tappan et al. | |
| 2015/0242410 A1* | 8/2015 | Pattabhiraman | G06Q 10/06 |
| | | | 707/728 |
| 2015/0341212 A1 | 11/2015 | Hsiao et al. | |
| 2016/0105328 A1 | 4/2016 | Cooper et al. | |
| 2016/0132595 A1* | 5/2016 | Bliss | H04L 67/10 |
| | | | 707/706 |
| 2016/0294606 A1 | 10/2016 | Puri et al. | |
| 2016/0320768 A1* | 11/2016 | Zhao | G05B 19/406 |
| 2017/0004433 A1 | 1/2017 | Raghavan et al. | |
| 2017/0083572 A1 | 3/2017 | Tankersley et al. | |
| 2017/0085447 A1* | 3/2017 | Chen | H04L 43/024 |
| 2017/0097632 A1* | 4/2017 | You | G05B 19/4183 |
| 2017/0168993 A1 | 6/2017 | Prakash et al. | |
| 2017/0255683 A1 | 9/2017 | Bingham et al. | |
| 2017/0308069 A1* | 10/2017 | Entzminger | G05B 19/4183 |

\* cited by examiner

FIG. 5 ated,"DYNAMIC SUMMARIZATION OF PROCESS DATA SYSTEM AND METHOD"

CROSS-REFERENCE TO RELATED APPLICATIONS

This application is a Continuation application of U.S. patent application Ser. No. 16/566,762, filed Sep. 10, 2019, entitled, "DYNAMIC SUMMARIZATION OF PROCESS DATA SYSTEM AND METHOD", which claims priority to U.S. Provisional Patent Application No. 62/729,345, filed Sep. 10, 2018, entitled, "DYNAMIC SUMMARIZATION OF PROCESS DATA SYSTEM AND METHOD", the entire contents of which are incorporated herein by reference.

BACKGROUND

Typical industrial processes are extremely complex and receive substantially greater volumes of information than any human could possibly digest in its raw form. By way of example, it is not unheard of to have thousands of sensors and control elements (e.g., valve actuators) monitoring/controlling various aspects of a multi-stage process within an industrial plant. These sensors are of varied type and report on varied characteristics of the process. Their outputs are similarly varied in the meaning of their measurements, in the amount of data sent for each measurement, and in the frequency of their measurements. To support analysis and increase user understanding of overall trends and patterns, it is helpful to calculate summary statistics of high-fidelity time-series data. In continuous processes, the primary context for this summarization is time, so periodic time intervals are commonly used (e.g. hourly, daily). In batch, semi-batch and other non-continuous processes, "batch", "lot", "operator" etc. are much more significant contexts than time of day, and these contexts can change in an irregular manner. New systems are needed to provide summary statistics based on these irregular contexts so that they are more meaningful and relevant in non-continuous processes.

Currently in a historian program (e.g., such as Aveva Insight™/Intelligence or SDK), summary data can be retrieved in cycles by providing the resolution parameter through an "SDK/SQL/REST" application programming interface (API). There is a need for systems that enable cycles to be dynamically changed/computed at runtime by another tag state. Further, in some instances, users may want to retrieve analog summary for tags sliced by some other tags in the system, or require a system that can provide an array of resolution or timespan data in the query instead of passing the resolution or cycle count. This capability would enable correlation of the historian tag's summary with other tag's data, such as manufacturing execution system (MES) equipment states or events, or other MES data tags, such as batch number.

SUMMARY OF THE INVENTION

Some embodiments include a computer-implemented method comprising providing a historian including an interface system comprising a graphical user interface (GUI) of a remote display device. In some embodiments, the historian receives operational state data from at least one device of an industrial process of a network, where the operational state data is stored as time-series data on at least one non-transitory computer-readable storage medium of a network. Some embodiments include a computer-implemented method including processing at least one data query from at least one user coupled to the network. In some embodiments of the computer-implemented method, based at least in part on the at least one data query and at least one dynamic cycle, at least some of the time-series data is retrieved, where the dynamic cycle is based on at least one tag associated with the time-series data. In some further embodiments of the computer-implemented method, based at least in part on at least some of the time-series data, at least one graphical representation of one or more tags is displayed, where each tag of the one or more tags represents an attribute of at least one process associated with the at least one device.

In some embodiments of the computer-implemented method, at least one dynamic cycle comprises a cycle duration over which summarized tag data is provided to the at least one user. In some embodiments of the computer-implemented method, the graphical representation comprises at least one bar-chart. In some embodiments of the computer-implemented method, the bar-chart includes tag data of at least one of a running process, a shutdown process, a jammed process, and an overheated process. In some embodiments of the computer-implemented method, the at least one bar-chart includes a selectable time-span of tag data.

In some embodiments of the computer-implemented method, the summarized data includes a summarization of a plurality of tags over multiple states. In some embodiments of the computer-implemented method, the states include two or more of "Running", "Shutdown", "Jammed", and "Overheated".

In some embodiments of the computer-implemented method, the at least one query includes tag details comprising the at least one tag. In some embodiments of the computer-implemented method, the dynamic cycle is based on a value change of the at least one tag.

Some embodiments of the invention include a server system comprising program logic tangibly stored on at least one non-transitory computer-readable storage medium of a network including at least one processor coupled to a historian. In some embodiments, the historian is configured to receive operational state data from at least one device of an industrial process of the network and store time-series data on the at least one non-transitory computer-readable storage medium of a network. Further, in some embodiments, upon execution of at least a portion of the program logic by the at least one processor, the at least one processor is configured to process steps of a method. In some embodiments, the steps include providing a historian interface system comprising a graphical user interface (GUI) of a remote display device. In some embodiments, the steps include processing at least one data query from at least one user coupled to the network. In some embodiments of a step of the method, based at least in part on the at least one data query and at least one dynamic cycle, the step includes retrieving at least some of the time-series data, where the dynamic cycle is based on at least one tag associated with the time-series data. In some embodiments of a step of the method, based at least in part on at least some of the time-series data, the step can include displaying at least one graphical representation of one or more tags, where each tag of the one or more tags represents an attribute of at least one process associated with the at least one device.

In some embodiments of a step, the at least one query includes tag details comprising the at least one tag. In some embodiments of a step, the at least one dynamic cycle comprises a cycle duration over which summarized tag data is provided to the at least one user. In some embodiments of a step, the summarized data includes a summarization of a plurality of tags over multiple states. In some embodiments of a step, the dynamic cycle is based on a value change of the at least one tag.

In some embodiments of a step, the graphical representation of one or more tags includes statistics of tag data selectable over a time-span of tag data based on at least one other tag data. In some embodiments of a step, the graphical representation comprises includes statistics of tag data of at least one of a running process, a shutdown process, a jammed process, and an overheated process. In some embodiments of a step, the graphical representation comprises at least one bar-chart. In some embodiments of a step, the at least one bar-chart includes a selectable time-span of tag data.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the invention herein generally describe non-conventional approaches for data control server systems and methods that are not well-known, and further, are not taught or suggested by any known conventional methods or systems. Moreover, the specific functional features are a significant technological improvement over conventional methods and systems, including at least the operation and functioning of a computing system that are technological improvements. These technological improvements include one or more aspects of the systems and method described herein that describe the specifics of how a machine operates, which the Federal Circuit makes clear is the essence of statutory subject matter.

One or more of the embodiments described herein include functional limitations that cooperate in an ordered combination to transform the operation of a data repository in a way that improves the problem of data storage and updating of databases that previously existed. In particular, some embodiments described herein include system and methods for managing single or multiple content data items across disparate sources or applications that create a problem for users of such systems and services, and where maintaining reliable control over distributed information is difficult or impossible.

The description herein further describes some embodiments that provide novel features that improve the performance of communication and software, systems and servers by providing automated functionality that effectively and more efficiently manages resources and asset data for a user in a way that cannot effectively be done manually. Therefore, the person of ordinary skill can easily recognize that these functions provide the automated functionality, as described herein, in a manner that is not well-known, and certainly not conventional. As such, the embodiments of the invention described herein are not directed to an abstract idea and further provide significantly more tangible innovation. Moreover, the functionalities described herein were not imaginable in previously-existing computing systems, and did not exist until some embodiments of the invention solved the technical problem described earlier.

In relation to the embodiments described herein, in general, a historian can store (i.e., "historize") various types of data related to one or more industrial processes including data received from sensors or probes. Some example data include, but are not limited to, time-series data, event data, configuration data, raw time-series binary data, diagnostic log data, and metadata or tag metadata, and/or combinations thereof. An operational historian can usually analyze process related data stored in an operational historian database and transform that data into timely reports that are communicated to one or more user devices. Further, the historian can record trends and historical information about the industrial process for future reference. In this manner, an operational historian can filter (i.e., curate) data to raise visibility of the data to users (e.g., via user devices) without overwhelming them and/or overburdening communications networks.

In relation to the embodiments herein, tag metadata (hereinafter "tag") can comprise data content description or information, where the data values of tags correspond to data derived from one or more process devices within an industrial process. A tag can comprise a sequence of letters and/or numbers and can include process control tags associated with a process control system, process components, and/or any process variables, time-series data, or other data, etc.) In some embodiments, the tag can comprise the asset identification or data associated with the asset such as any conventional industrial component, including, but not limited to, tanks or reservoirs, meters, valves, flow restrictors or diverters, heating or cooling assemblies, separators, filters or filtration systems, mixers, pumps, optical systems, electrical systems, electromagnetic systems, etc.

In some embodiments, historian capable systems such as AVEVA Insight™ or intelligence products can retrieve or display the statistics of a tag for a given timespan or resolution for, as a non-limiting example, fifteen minutes or 1 hour, and so on. However, with embodiments of the invention comprising "SliceBy" features described herein, the users can be extended such that statistics are displayed by another tag's values. In this instance, from a "High-Level Retrieval" (HLR) point of view, instead of computing the cycle by resolution or cycle count, embodiments of the system can compute cycles based on a "SliceBy" tag's value change. In some embodiments, applications such as Aveva Insight™ can also leverage this feature in their column chart to display statistics by another tag which is a "SliceBy" tag.

Figure 1:
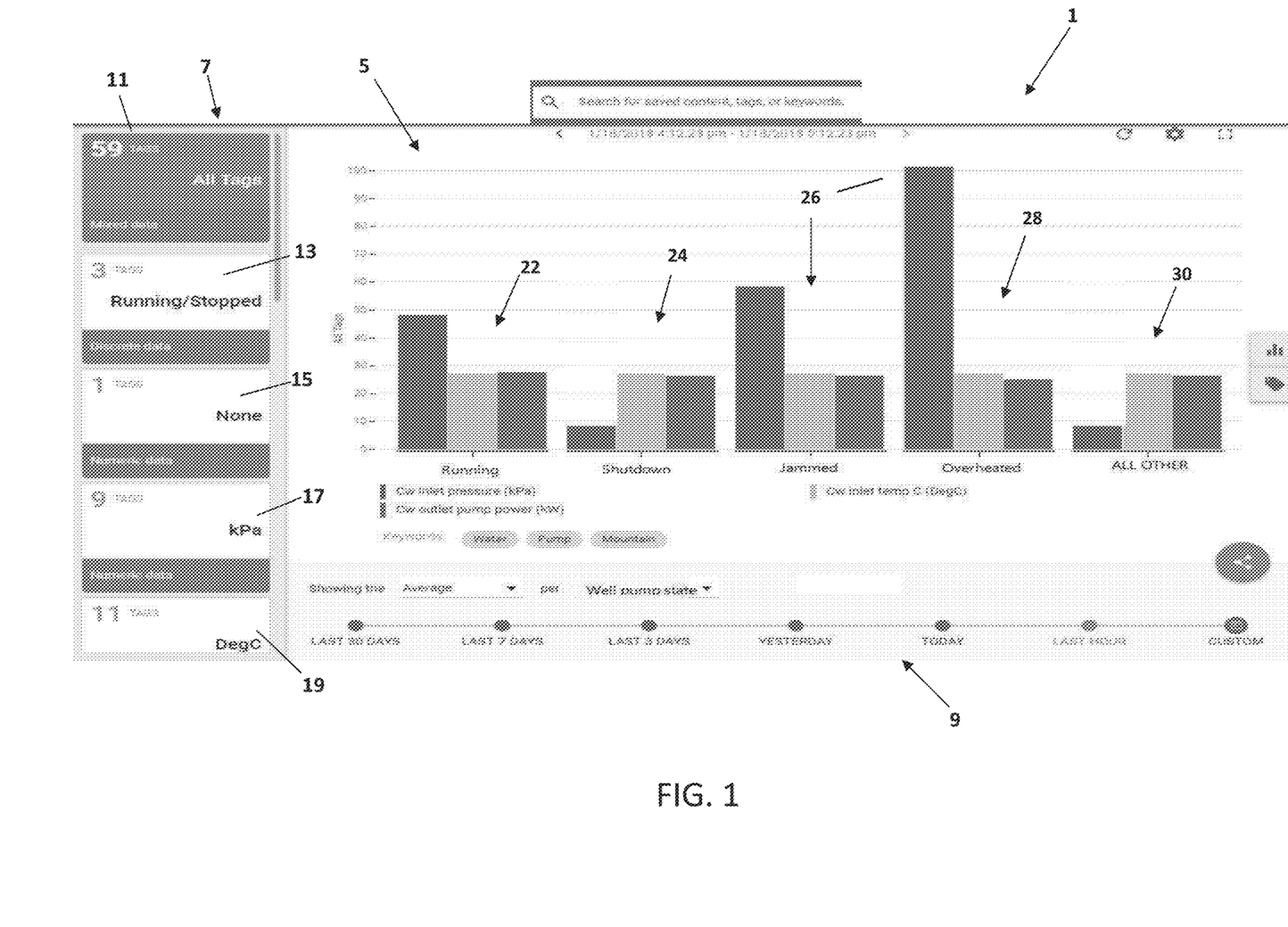
FIG. 1 is a perspective view of a display of the system including a column chart configured to display statistics by tags of the system according to one embodiment of the invention.

For example, FIG. 1 is a perspective view of a display 1 of the system including a column chart 5 configured to display statistics by tags of the system according to one embodiment of the invention. In some embodiments, the display can include an all tags display 7 that can provide a tag statistics summary. Some embodiments include a total tags indicator 11, and/or a running/stopped tag indicator 13, and/or a discrete data tag indicator 15, and/or a numeric data tag indicator 17, and/or a numeric data tag indicator 19.

In some embodiments, a summarization of three tags over multiple states such as "Running", "Shutdown", "Jammed", and "Overheated" can be displayed. For example, in some embodiments, the display 1 can include a search function for use in searching saved content, tags, and/or keywords. In some embodiments, the column chart 5 can comprise a bar statistics of tags related to running processes 22. Further, some embodiments include a bar statistics of tags related to shutdown processes 24. Further, some embodiments include a bar statistics of tags related to jammed processes 26. Further, some embodiments include a bar statistics of tags related to overheated processes 28. Further, some embodiments include a bar statistics of tags related to all other processes 30. In some embodiments, any of the statistics of the display 1, including any one or more of the bar statistics of column chart 5 can be adjusted by data type or operation (just as selecting average data), and/or a sensor or component, and/or by a date or timespan selector 9.

Some embodiments of the invention include "SliceBy" features where cycles can be dynamically changed and/or computed at runtime by another tag state i.e. resolution will be defined by the "SliceBy" tag's change of state.

Some embodiments include retrieving a summary (analog/state) for one or more tags based on another tag (e.g., one or more) values.

In some embodiments, the system can be extensible and flexible to extend this functionality for process values as well. In some embodiments, the system can handle an array of resolutions provided by clients which will be used to correlate tag values based on event/alarm duration.

Figure 3:
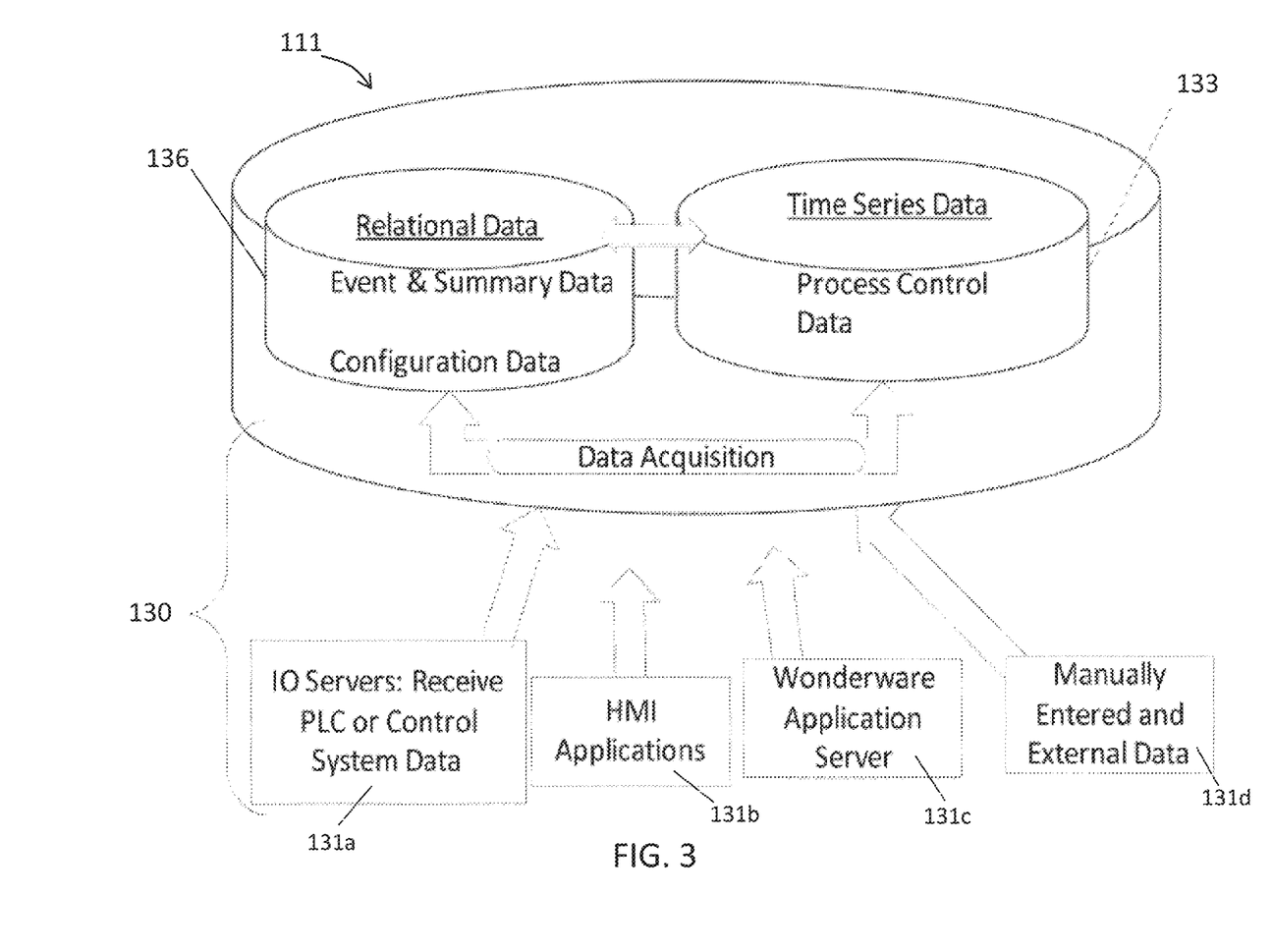
FIG. 3 depicts an example historian of one or more embodiments of the invention.

In some embodiments, instead of defining a fixed cycle duration to generate a summarized data, this system provides summarization cycles to be based on the context of another tag such as a batch id change. In one non-limiting example embodiments, if a user wants an analog summary for a "SysTimeMin" tag, but requires it to be sliced by a "SysTimeHour" tag for a given time range, the user can use REST/SDK/SQL route to achieve it. In this instance, the user can pass all necessary information in the query along with "SliceBy" tag details in the request body. Now the historian 111 can compute the cycle based on the "SliceBy" Tag. For example, in this case, the cycle time range will be at every hour, i.e. the "SysTimeHour" value changes every hour which means at every value change, the cycle will be defined.

For below query, Time range of the query—2018-02-28T18:30:33.966Z to 2018-02-28T21:00:00Z (time in UTC). A number of "SysTimeHour" values during the time range can be 10, 11, 12, and a number of cycles can be three. Further details are shown in Table 1 below:

TABLE 1

| TagName | StartDateTime | EndDateTime | Resolution |
|---|---|---|---|
| SysTimeMin | 2018-02-28T18:30:33.966Z | 2018-02-28T19:00:00Z | 1766034 |
| SysTimeMin | 2018-02-28T19:00:00Z | 2018-02-28T20:00:00Z | 1800000 |
| SysTimeMin | 2018-02-28T20:00:00Z | 2018-02-28T21:00:00Z | 1800000 |

A non-limiting embodiment of a sample request can comprise sample request:

POST/Historian/v2/AnalogSummary HTTP/1.1
Host: localhost:32567
Content-Type: application/json
Cache-Control: no-cache
Postman-Token: 62f1bcf3-0761-cce6-e489-6c945be8a5c4
{"FQN":["SysTimeMin"],
"StartDateTime":"2018-02-28T18:30:33.966Z",
"EndDateTime":"2018-02-28T21:00:00Z",
"SliceBy":["SysTimeHour"]

Figure 2:
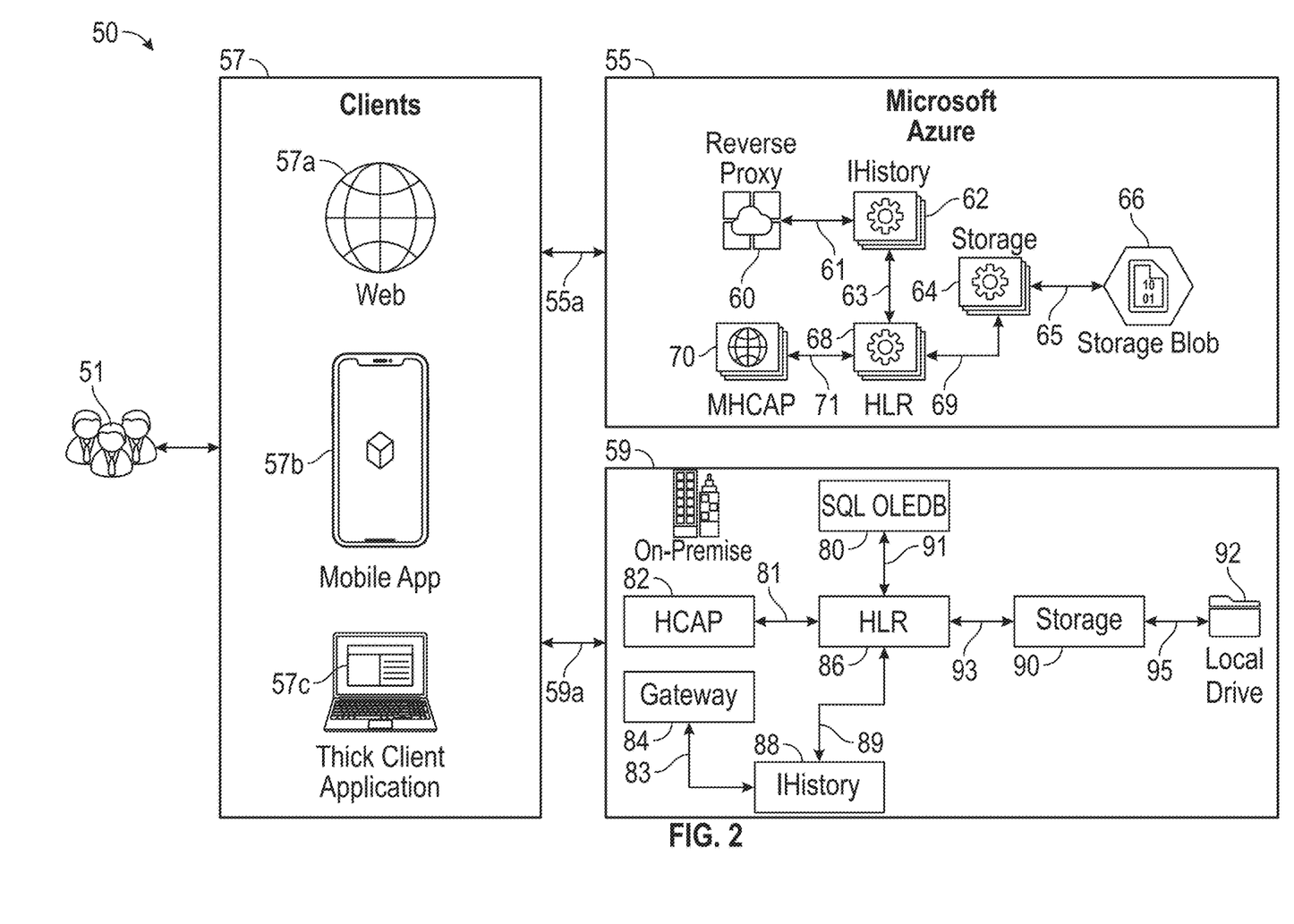
FIG. 2 illustrates an architecture of the system and method according to one embodiment of the invention.

FIG. 2 illustrates an architecture 50 of the system and method according to one embodiment of the invention. In some embodiments, one or more users 51 can use a client-side interface 57 including any one of a web-interface 57a, mobile application interface 57b, and/or thick client application 57c. In some embodiments, users 51 can establish data communications 55a and/or 59a with one or more computing platforms, including, but not limited to a cloud-based platform 55 and/or on-premise platform 59. In some embodiments, the one or more computing platforms can comprise a Microsoft® Azure® platform. Microsoft®, and Microsoft® Azure® are registered trademarks of Microsoft Corporation in the United States and/or other countries.

In some embodiment, a cloud-based portion of the architecture 50 can comprise any one or more of "Reverse Proxy" 60, "IHistory" 62, "MHCAP" 70, "HLR" 68, "Storage" 64, and "Storage Blob" 66 as shown. In some further embodiments, an on-premise platform 59 of the architecture 50 can include any one or more of "HCAP" 82", "HLR" 86, "SQL OLEDB" 80 (e.g., Microsoft® OLE DB provider for SQL server), "Gateway" 84, "IHistory" 88, "Storage" 90, and "Local Drive" 92. In some embodiments, any portion of the on-premise platform 59 can be supported by or comprise a cloud-based platform.

In some embodiments, the architecture 50 includes example data flow and/or communication couplings represented by one or more connectors. For example, some embodiments include data flow, a process, and/or communication represented by the connector 61. Some embodiments include data flow, a process, and/or communication represented by the connector 71. Some further embodiments include data flow, a process, and/or communication represented by the connector 69. Some other embodiments include data flow, a process, and/or communication represented by the connector 65. Some embodiments include data flow, a process, and/or communication represented by the connector 81. Some embodiments include data flow, a process, and/or communication represented by the connector 83. Some embodiments include data flow, a process, and/or communication represented by the connector 91. Some embodiments include data flow, a process, and/or communication represented by the connector 93. Some embodiments include data flow, a process, and/or communication represented by the connector 89. Some embodiments include data flow, a process, and/or communication represented by the connector 95.

In some embodiments of the invention, the system and method can extend an analog and state summary "REST interface" to specify "SliceBy" tags. Some embodiments include up to ten "SliceBy" tags. Other embodiments include more or fewer "SliceBy" tags. Some embodiments can extend OLEDB SQL support to specify one or more "SliceBy" tags parameters as a web query parameter. In some embodiments, through an SQL interface, there can be one "SliceBy" tag. In other embodiments, through an SQL interface, there can be include multiple "SliceBy" tags.

In some embodiments, to support this requirement, analog/state summary retrieval API's (SQL/REST/SDK) can to be extended. In some embodiments, an API request can be extended to accept array of "SliceBy" tags. In some embodiments, if "SliceBy" tags are provided, then cycles will be computed whenever those tag value changes (delta on "SliceBy" tags).

In some embodiments of the invention, an API response can return one analog summary value per tag per dynamic cycle with start and end date time. In some embodiments, the API response can include "SliceBy" tags state or value during that cycle. If there are more than one "SliceBy" tag, then the response can have individual "SliceBy" tag states.

In relation to the embodiments described herein, FIG. 3 illustrates a non-limiting example historian 111 for securely providing and obtaining configuration data of an industrial process. In some embodiments, the historian 111 can include a time-series database 133 and a relational database 136 according to an embodiment of the invention. In at least one embodiment, the time-series database 133 and the relational database 136 can each derive data from various sources during data acquisition 130, including, but not limited to, one or more servers 131a, one or more human-machine-interface (HMI) applications 131b, at least one application server 131c, and manually entered and/or external data 131d. In some embodiments, time-series data can in part be provided by process control data stored in the time-series database 133, where the time-series data can be representative of historical plant process information such as, for example, a continuum of process flow values measured over one or more timespans. In some non-limiting embodiments, configuration data can, at least in part, be provided by the relational database 136, such as, configuration settings for a cloud service and associated storage capability utilized by the historian 111. In some embodiments, the historian 111 can comprise processor-executable instructions embodied on a storage memory device (e.g., as part of a server computing device) to provide the operational historian via a software environment in Wonderware® Historian and Wonderware® Online commercially available from AVEVA Group, plc.

Figure 4:
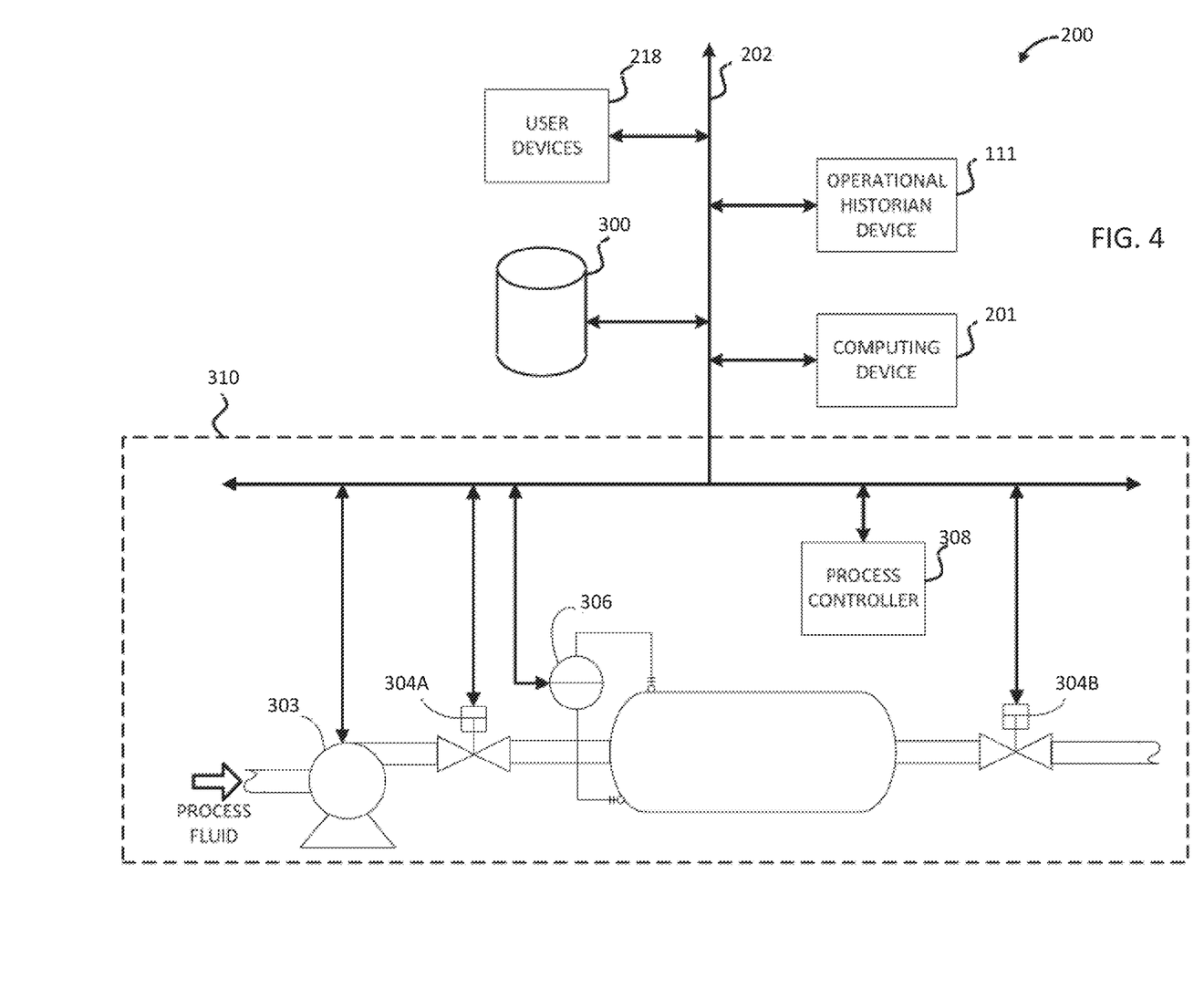
FIG. 4 illustrates an industrial process system of one or more embodiments of the invention.

In some embodiments, the operational historian 111 can store data about various aspects of an industrial process in quantities that humans cannot interpret or analyze. For example, an operational historian may receive two million or more data values (e.g., tags relating to process control components, process variables, etc.) every second. For example, FIG. 4 illustrates a non-limiting example embodiment of an industrial process system 200 including the coupled historian 111. In some embodiments, the system 200 can include at least one computing device 201, at least one coupled database 300, at least one user device 218, at least one communication network 202, and at least a portion of a coupled industrial system such as fluid processing system 310. As a non-limiting example embodiment, the fluid processing system 310 can be adapted for changing or refining raw materials to create end products. Further, some aspects of the invention are capable of optimizing processes and processing systems other than fluid processing system 310 and that system 310 is presented for illustration purposes only. Additional example processes include, but are not limited to, those in the chemical, oil and gas, food and beverage, pharmaceutical, water treatment, and power industries.

In some embodiments, the operational historian 111 can be adapted to store various types of data related to one or more of the operational states of the fluid processing system 310. By way of example, in some embodiments, the fluid processing system 310 of this non-limiting embodiment includes at least one pump 303, one or more valves 304A, 304B, at least one sensor 306, and at least one process controller 308. In system 200, the computing device 201, operational historian device 111, database 300, user devices 218, and various components of the fluid processing system 310 (e.g., pump 303, valves 304A, 304B, sensor 306, process controller 308) are communicatively connected via the communication network 202. In some embodiments, the communication network 202 can facilitate the exchange of data among the historian 111, computing device 201, database 300, user devices 218, and one or more components of the fluid processing system 310. In an embodiment, process controller 308 provides an interface or gateway between components of fluid processing system 310 (e.g., pump 303, valves 304, sensor 306) and other components of system 300 (e.g., historian 111, computing device 201, and user devices 218). In another embodiment, components of fluid processing system 310 can communicate directly with the historian 111, and/or computing device 201, and/or user devices 218 via the communication network 202. In yet another embodiment, the process controller 308 can transmit data to and receive data from pump 303, and/or one or more valves 304A, 304B, and/or sensor 306 for controlling and/or monitoring various aspects of fluid processing system 310.

In some embodiments, the communication network 302 can be a local area network (LAN) that is coupled to other telecommunications networks, including other LANs or portions of the Internet or an intranet. In some embodiments, the communication network 302 may be any telecommunications network that facilitates the exchange of data, such as those that operate according to the IEEE 802.3 (e.g., Ethernet) and/or the IEEE 802.11 (e.g., Wi-Fi). Alternatively, the communication network 302 can be any medium that allows data to be physically transferred through serial or parallel communication channels (e.g., copper, wire, optical fiber, computer bus, wireless communication channel, etc.). In an embodiment, communication network 302 comprises at least in part a process control network.

Embodiments of the invention include various methods, apparatuses (including computer systems) that perform such methods, and computer readable media containing instructions that, when executed by computing systems, cause the computing systems to perform such methods. For example, non-limiting embodiments can comprise certain software instructions or program logic stored on at least one non-transitory computer-readable storage medium for tangibly storing thereon program logic for execution by at least one processor of the system or coupled to the system.

For the purposes of this disclosure the term "server" should be understood to refer to a service point which provides processing, database, and communication facilities. A computing device (e.g., such as computing device 201) may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as a Microsoft® Windows® Server, Mac OS X, Unix, Linux, and/or any other conventional operating system. Microsoft® and Windows® are registered trademarks of Microsoft Corporation, Redmond, Washington For the purposes of this disclosure a "network" should be understood to refer to a network that may couple devices so that communications may be exchanged, such as between a server and a client device, peer to peer communications, or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, "Integrated Services Digital Networks" (ISDNs), "Digital Subscriber Lines" (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple user or client devices with a network. A wireless network may employ stand-alone ad-hoc networks, mesh networks, wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including "Long Term Evolution" (LTE), WLAN, wireless router (WR) mesh, or 2nd, 3rd, 4th, or 5th generation (2G, 3G, 4G, or 5G) cellular technology, or the like. Network access technologies may enable wide area coverage for devices, such as client devices with varying degrees of mobility, for example. For example, a network may enable RF or wireless type communication via one or more network access technologies, such as "Global System for Mobile communication" (GSM), "Universal Mobile Telecommunications System" (UMTS), "General Packet Radio Services" (GPRS), "Enhanced Data GSM Environment" (EDGE), 3GPP LTE, LTE Advanced, "Wideband Code Division Multiple Access" (WCDMA), Bluetooth®, 802.11b/g/n, or the like. A wireless network may include virtually any type of wireless communication mechanism by which signals may be communicated between devices, such as a client device or a computing device, between or within a network, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (TR) device, a near field communication (NFC) device, a personal digital assistant (PDA), a handheld computer, a tablet computer, a phablet, a laptop computer, a set top box, a wearable computer, an integrated device combining various features, such as features of the forgoing devices, or the like.

A client device may vary in terms of capabilities or features, and claimed subject matter is intended to cover a wide range of potential variations. A web-enabled fixed or mobile device may include a browser application that is configured to receive and to send web pages, web-based messages, and the like. The browser application may be configured to receive and display graphics, text, multimedia, and the like, employing virtually any conventional web-based language.

Some embodiments include a computer-implemented method comprising program logic executed by at least one processor of a computer system that can provide an environment that allows users to utilize a graphical user interface (GUI) to visualize data or blocks of data, monitor data and alarms, including one or more transitions to or from an alarm or alert state. For example, the historian 111 may provide a tool for use by a user that enables the user to monitor storage blocks and functionality, and that enables a user to observe incoming event data, the merging of snapshots in a storage block, and responses to queries. This information may be conveyed to a user in the form of text and/or graphics in the GUI. The GUI may have a variety of icons indicating different event data, storage blocks, or snapshots, and alarms. Further, some embodiments include a computer-implemented method that includes: retrieving, by a computer system from a data store, a file comprising a plurality of data; displaying data or updating the display based at least in part on data or information related to the file via a display screen of a user interface in communication with the computer system. In some embodiments of the invention, the display can include a display of a computer system, a personal digital assistant, a cellular or smart phone, a digital tablet, and/or other fixed or mobile Internet appliances.

Figure 5:
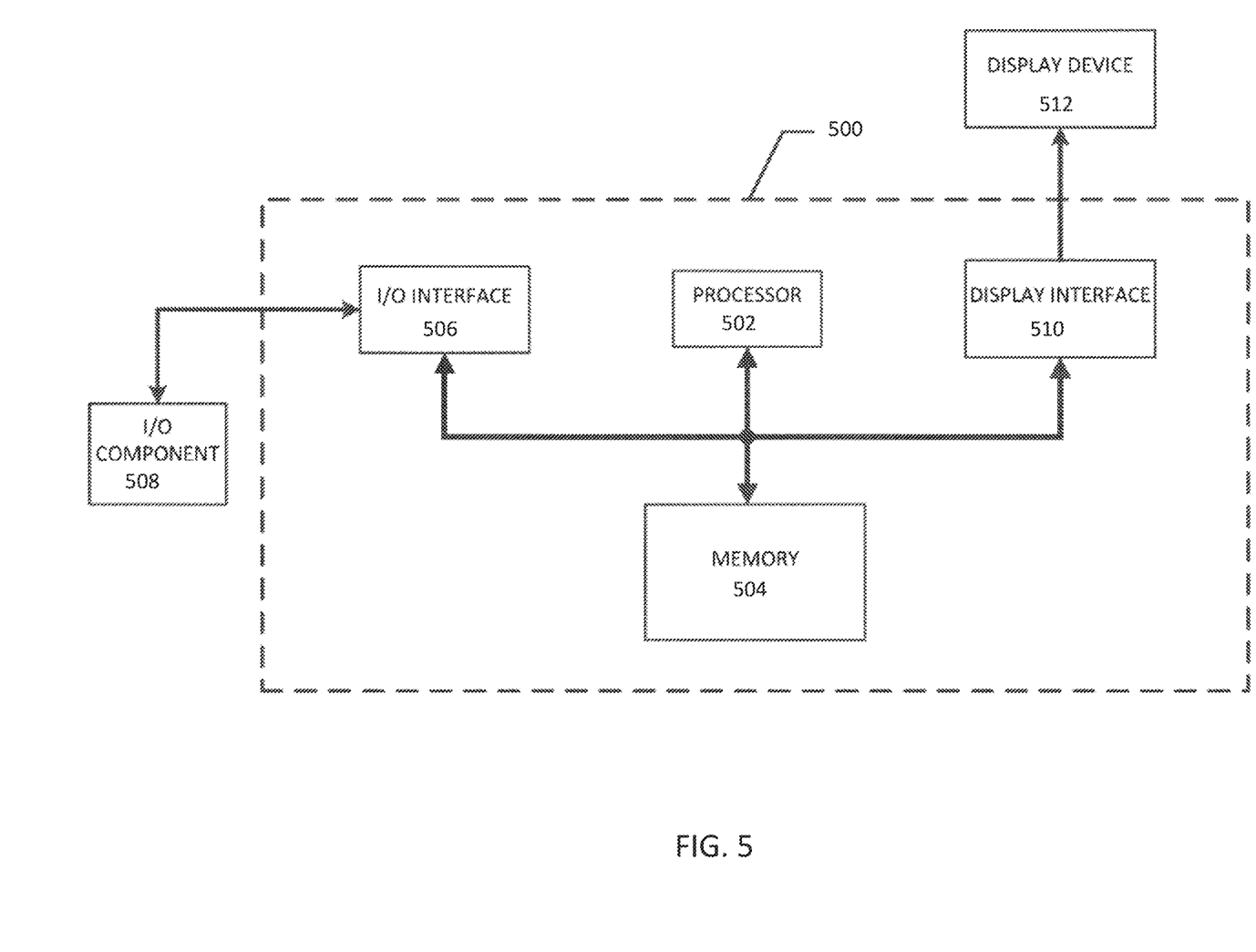
FIG. 5 illustrates a system architecture of a computing device of the operational historian according to some embodiments of the invention.

FIG. 5 illustrates a system architecture 500 of the computing device 201 that can operate at least some aspects of the operational historian 111 via a software environment. In this embodiment, the computing device 201 can include at least one processor 502, at least one memory 504, and at least one input/output (I/O) interface 506 that interfaces with at least one I/O component 508. In some embodiments, the memory 504 can comprise storage 300. In some embodiments, the processor 502, memory 504, and I/O interface 506 can be communicatively connected and/or electrically connected to each other. In some embodiments, the I/O interface 506 can be communicatively and/or electrically connected to the I/O component 508. In some embodiments, the processor 502 can be adapted to execute processor-executable instructions stored in the memory 504 for implementing one or more operations of the historian 111. In some embodiments, the I/O interface 506 of FIG. 5 can provide a physical data connection between one or more components of the system architecture 500, and I/O component 508, and any other coupled system, assembly or component, including, but not limited to, any portion of one or more industrial processes such as fluid processing system 310. In some embodiments, I/O interface 506 can be a network interface card ("NIC") or modem, and I/O component 508 comprises a telecommunications network.

In some embodiments, the system architecture 500 includes a display interface 510 coupled to a display device 512. In some embodiments, the systems and methods of the invention can generate information that can be conveyed to a user in the form of text and/or graphics in a graphical user interface (GUI) generated by the display interface 510 on the display device 512. In some embodiments, the GUI may have a variety of icons indicating different event data, storage blocks, or snapshots, alarms status updates, and utilization data. In some embodiments, the display device 512 that can be any fixed or mobile computing device that can be wired and/or wirelessly coupled to the Internet or through an Intranet and/or Ethernet, including, but not limited to, desktop computers, laptop computers, digital assistants, personal digital assistants, cellular phones, mobile phones, smart phones, pagers, digital tablets, internet appliances, vehicular displays, wearable displays, virtual reality viewing devices such as virtual reality headsets, virtual reality glasses, and the like and other processor-based devices.

In some embodiments, the GUI can comprise an HMI that provides a graphical view/window representing a status or utilization of a process/plant, and/or a specific piece of equipment, and/or component, or portion thereof. In some embodiments, one or more human-machine-interface (HMI) applications 131b can manage an HMI enabling intake and processing of an operators control instructions, and display device status updates. For example, in some embodiments, software instructions stored on a tangible, non-transitory media and executable by a processor can receive data indicative of a manufacturing/process control system being monitored, and can display at least one status or status update of the manufacturing/process control system being monitored, where the status is based on the received data. In addition, some logic instructions can manage a display of graphic elements as part of the user interface, where one or more of the elements is associated with and indicative of a status (e.g., such as an alarm status) of one or more aspects of the manufacturing/process control system being monitored.

Embodiments of the invention may comprise a special purpose computer including a variety of computer hardware, as described in greater detail below. Embodiments within the scope of the invention can also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general-purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Any aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Some embodiments include a system for implementing aspects of the disclosure that includes a special purpose computing device in the form of a conventional computer, including a processing unit, a system memory, and a system bus that can couple various system components including the system memory to the processing unit. In some embodiments, the system bus may be any of several types of bus structures including a memory bus or memory controller, a peripheral bus, and a local bus using any of a variety of bus architectures. In some embodiments, the system memory includes read only memory (ROM) and random-access memory (RAM). Further, some embodiments include a basic input/output system (BIOS), containing the basic routines that help transfer information between elements within the computer, such as during start-up, may be stored in ROM. Further, in some embodiments, the computer may include any device (e.g., computer, laptop, tablet, PDA, cell phone, mobile phone, a smart television, and the like) capable of receiving or transmitting an IP address wirelessly to or from the Internet.

In some embodiments, the computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. In some embodiments, the magnetic hard disk drive, magnetic disk drive, and optical disk drive can be connected to the system bus by a hard disk drive interface, a magnetic disk drive-interface, and an optical drive interface, respectively. In some embodiments, the drives and their associated computer-readable media can provide non-volatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including, but not limited to, magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can be accessed by the computer. Alternatively, communication media typically embody computer readable instructions, data structures, program modules or other data in a modulated data signal such as a carrier wave or other transport mechanism and includes any information delivery media.

Some embodiments include program modules comprising program code that may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). In some embodiments, the monitor or another display device is also connected to the system bus via an interface, such as a video adapter. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices, including any of the devices disclosed herein.

In some embodiments, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like. Further, in some embodiments, the computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

In some embodiments, when used in a LAN networking environment, the computer can be connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

In some embodiments, the computer-executable instructions are stored in a memory, such as the hard disk drive, and executed by the computer. Advantageously, the computer processor has the capability to perform all operations (e.g., execute computer-executable instructions) in real-time. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Embodiments of the disclosure may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by description herein.

The invention claimed is:

1. A server system comprising:
one or more computers comprising one or more processors and one or more non-transitory computer readable media, the one or more non-transitory computer readable media including instructions stored thereon that when executed cause the one or more computers to:
receive, by the one or more processors, tag data including operational state data stored as time-series data from one or more process devices within an industrial process;
store, by the one or more processors, the tag data on the one or more non-transitory computer readable media;
receive a data query from a user, the data query including at least one tag associated with the tag data;
determine at least one dynamic cycle based on a value change of the at least one tag in response to receiving the data query;
retrieve, by the one or more processors, at least some of the tag data from the one or more non-transitory computer readable media based on the data query and the at least one dynamic cycle, the at least some tag data including time-series data;
correlate, by the one or more processors, the time-series data with other tag data including equipment states or events associated with the cycle duration of the dynamic cycle; and
generate, by the one or more processors, a display on the GUI including the summarized tag data, the summarized tag data being a summarization of the correlation as a plurality of tags over multiple states or events.

2. The server system of claim 1,
wherein the summarization comprises a chart displaying the plurality of tags over multiple states.

3. The server system of claim 2,
wherein the multiple states include at least one of a running process, a shutdown process, a jammed process, and an overheated process.

4. The server system of claim 1,
wherein the tag data including the time-series data is received from one or more sensors or probes.

5. The server system of claim 1,
wherein the display includes statistics of the tag data based on a value change of the correlated other tag data.

6. A server system comprising:
one or more computers comprising one or more processors and one or more non-transitory computer readable media, the one or more non-transitory computer readable media including instructions stored thereon that when executed cause the one or more computers to:
receive, by the one or more processors, one or more tags each including tag data comprising at least one of a sequence of letters and numbers associated with one or more process control systems, process components, process variables, asset identifications, and time-series data;
store, by the one or more processors, the one or more tags on the one or more non-transitory computer readable media;
receive, by the one or more processors, a data query from a user, the data query at least one tag associated with the tag data;
determining at least one dynamic cycle based on a value change of the at least one tag in response to receiving the data query;
retrieve, by the one or more processors, at least some of the tag data from the one or more non-transitory computer readable media in response to receiving a data query from a user and based on the at least one dynamic cycle and one or more states from one or more other tags, the at least some tag data including time-series data; and
generate, by the one or more processors, the graphical representation that includes statistics of the one or more tags over a time span of the tag data based on a value change at least one of the one or more other tags.

7. The server system of claim 6,
wherein the statistics include at least one of a running process, a shutdown process, a jammed process, and an overheated process.

8. The server system of claim 6,
wherein the graphical representation comprises a chart comprising reference to both the one or more tags and the one or more other tags.

9. The server system of claim 6,
wherein each of the one or more tags represents an attribute of at least one process associated with at least one industrial device.

10. The server system of claim 6,
wherein the graphical representation further includes a summarization of a plurality of tags over multiple states.

11. A server system comprising:
one or more computers comprising one or more processors and one or more non-transitory computer readable media, the one or more non-transitory computer readable media including instructions stored thereon that when executed cause the one or more computers to:
receive, by the one or more processors, one or more tags each including tag data comprising at least one of a sequence of letters and numbers associated with one or more process control systems, process components, process variables, asset identifications, and time-series data;
store, by the one or more processors, the one or more tags on the one or more non-transitory computer readable media;
receive, by the one or more processors, a data query from a user, the data query comprising a request for a tag data cycle associated with the tag data to be computed based on a context of one or more events associated with a first tag;
compute, by the one or more processors, the tag data cycle based on a change in value of at least a second tag in response to receiving the data query, the second tag being associated with the one or more events associated with the first tag; and
generate, by the one or more processors, a graphical representation of the tag data cycle based on the one or more events associated with at least the second tag.

12. The server system of claim 11,
wherein the tag data is generated by one or more sensors.

13. The server system of claim 11,
wherein the graphical representation is generated in one or more reports; and
wherein the one or more reports are communicated to one or more user devices.

14. The server system of claim 11,
wherein the graphical representation includes a summarization of a plurality of tags over multiple states.

15. The server system of claim 11,
wherein the graphical representation includes statistics of the tag data based on a value change of the at least second tag.

* * * * *